United States Patent
Chang

(10) Patent No.: US 7,695,152 B2
(45) Date of Patent: *Apr. 13, 2010

(54) PRISM SHEET AND LIQUID CRYSTAL DISPLAY DEVICE USING THE SAME

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/946,862

(22) Filed: Nov. 29, 2007

(65) Prior Publication Data

US 2009/0046370 A1 Feb. 19, 2009

(30) Foreign Application Priority Data

Aug. 13, 2007 (CN) .......................... 2007 1 0201349

(51) Int. Cl.
  G09F 13/04 (2006.01)
  G09F 13/08 (2006.01)
(52) U.S. Cl. ...................... 362/97.2; 362/330; 362/606; 362/620; 362/626
(58) Field of Classification Search .................. 362/97, 362/223, 330, 606, 619–620, 625–626, 97.1–97.4; 349/61–66

See application file for complete search history.

(56) References Cited

U.S. PATENT DOCUMENTS

| 4,851,164 | A | * | 7/1989 | Hayashi | ..................... 264/1.36 |
| 5,696,630 | A | | 12/1997 | Hayashi | |
| 6,275,338 | B1 | * | 8/2001 | Arai et al. | ................... 359/599 |
| 7,175,330 | B1 | * | 2/2007 | Chen | ......................... 362/613 |

FOREIGN PATENT DOCUMENTS

JP         6308485       11/1994

* cited by examiner

*Primary Examiner*—Jason Moon Han
(74) *Attorney, Agent, or Firm*—Frank R. Niranjan

(57) ABSTRACT

An exemplary prism sheet includes a light input surface, a light output surface opposite to the light input surface, and a plurality of triangular pyramidal micro-elements and a plurality of hexagonal pyramidal micro-elements. The triangular pyramidal micro-elements and the hexagonal pyramidal micro-elements are formed on the light output surface. Each triangular pyramidal micro-element surrounded by three adjacent hexagonal pyramidal micro-elements. Bottom surfaces of each hexagonal pyramidal micro-element and each triangular pyramidal micro-element are coplanar with the light output surface. A liquid crystal display device using the prism sheet is also provided.

10 Claims, 6 Drawing Sheets

PRISM SHEET AND LIQUID CRYSTAL DISPLAY DEVICE USING THE SAME

CROSS-REFERENCE TO RELATED APPLICATIONS

This application is related to three co-pending U.S. patent applications, which are: applications Ser. No. 11/933,439 and Ser. No. 11/933,431, filed on Nov. 1, 2007, and both entitled "PRISM SHEET AND LIQUID CRYSTAL DISPLAY DEVICE USING THE SAME", and application Ser. No. 11/946,860, entitled "PRISM SHEET AND LIQUID CRYSTAL DISPLAY DEVICE USING THE SAME". In all these co-pending applications, the inventor is Shao-Han Chang. All of the co-pending applications have the same assignee as the present application. The disclosures of the above identified applications are incorporated herein by reference.

BACKGROUND OF THE INVENTION

1. Field of the Invention

The present invention generally relates to optical sheets, and particularly, to a prism sheet used in a liquid crystal display (LCD).

2. Discussion of the Related Art

FIG. 5 is an exploded, side cross-sectional view of a typical liquid crystal display device 100 employing a typical prism sheet 10. The liquid crystal display device 100 includes a housing 11 and a plurality of lamps 12 positioned in the housing 11. The liquid crystal display device 100 further includes a light diffusion plate 13, a prism sheet 10, and a LCD panel 15 stacked on the housing 11 in that order. The lamps 12 emit light, and inside walls of the housing 11 are configured for reflecting some of the light upwards. In use, light emitted from the lamps 12 enters the prism sheet 10 after scattered in the diffusion plate 13. The light is refracted and concentrated by the V-shaped protrusions 103 of the prism sheet 10, and then the light finally propagates into the liquid crystal display panel 15.

Referring to FIG. 6, the prism sheet 10 includes a base layer 101 and a prism layer 102 formed on the base layer 101. The prism layer 102 has a plurality of V-shaped protrusions 103. The V-shaped protrusions 103 are regularly arranged and extend along a direction parallel to one edge of the prism sheet 10. Typically, a method of manufacturing the prism sheet 10 includes following steps: first, a melted ultraviolet (UV)-cured transparent resin is coated on the base layer 101 to form V-shaped lenses, then the melted ultraviolet-cured transparent resin is solidified to form the prism layer 102. This results in that the V-shaped protrusions 103 of the prism layer 102 are easily damaged or scratched due to poor rigidity and mechanical strength.

However, the V-shaped protrusions 103 are prone to be aligned similarly to pixels of the liquid crystal display panel 15, consequently, moiré patterns may occur between the prism sheet 10 and the pixel pitch of the liquid crystal display panel 15. In order to reduce or eliminate the moiré patterns and protect the V-shaped protrusions 103 of the prism sheet 10, the liquid crystal display device 100 should further include an upper light diffusion film 14 on the prism sheet 10. However, although the upper light diffusion film 14 and the prism sheet 10 are in contact with each other, a plurality of air pockets still exist at the boundary between the light diffusion film 14 and the prism sheet 10. When the liquid crystal display device 100 is in use, light passes through the air pockets, and some of the light undergoes total reflection at one or another of the corresponding boundaries. In addition, the upper light diffusion film 14 may absorb an amount of the light from the prism sheet 10. As a result, a brightness of light illumination of the liquid crystal display device 100 is reduced.

Therefore, a new prism sheet is desired in order to overcome the above-described shortcomings.

SUMMARY

A prism sheet according to a preferred embodiment includes a light input surface, a light output surface opposite to the light input surface, and a plurality of triangular pyramidal micro-elements and a plurality of hexagonal pyramidal micro-elements. The triangular pyramidal micro-elements and the hexagonal pyramidal micro-elements are formed on the light output surface. Each triangular pyramidal micro-element is surrounded by three adjacent hexagonal pyramidal micro-elements. Bottom surfaces of each hexagonal pyramidal micro-element and each triangular pyramidal micro-element are coplanar with the light output surface.

A liquid crystal display device includes one or more light source, a light diffusion plate, a prism sheet described in the previous paragraph, and a liquid crystal display panel. The light diffusion plate is positioned above the light source. The prism sheet is positioned above the light diffusion plate. The liquid crystal display panel is positioned above the prism sheet.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating principles of the present prism sheet. Moreover, in the drawings, like reference numerals designate corresponding parts throughout several views, and all the views are schematic.

DETAILED DESCRIPTION OF THE PREFERRED EMBODIMENTS

Reference will now be made to the drawings to describe preferred embodiments of the present prism sheet, in detail.

Figure 1:
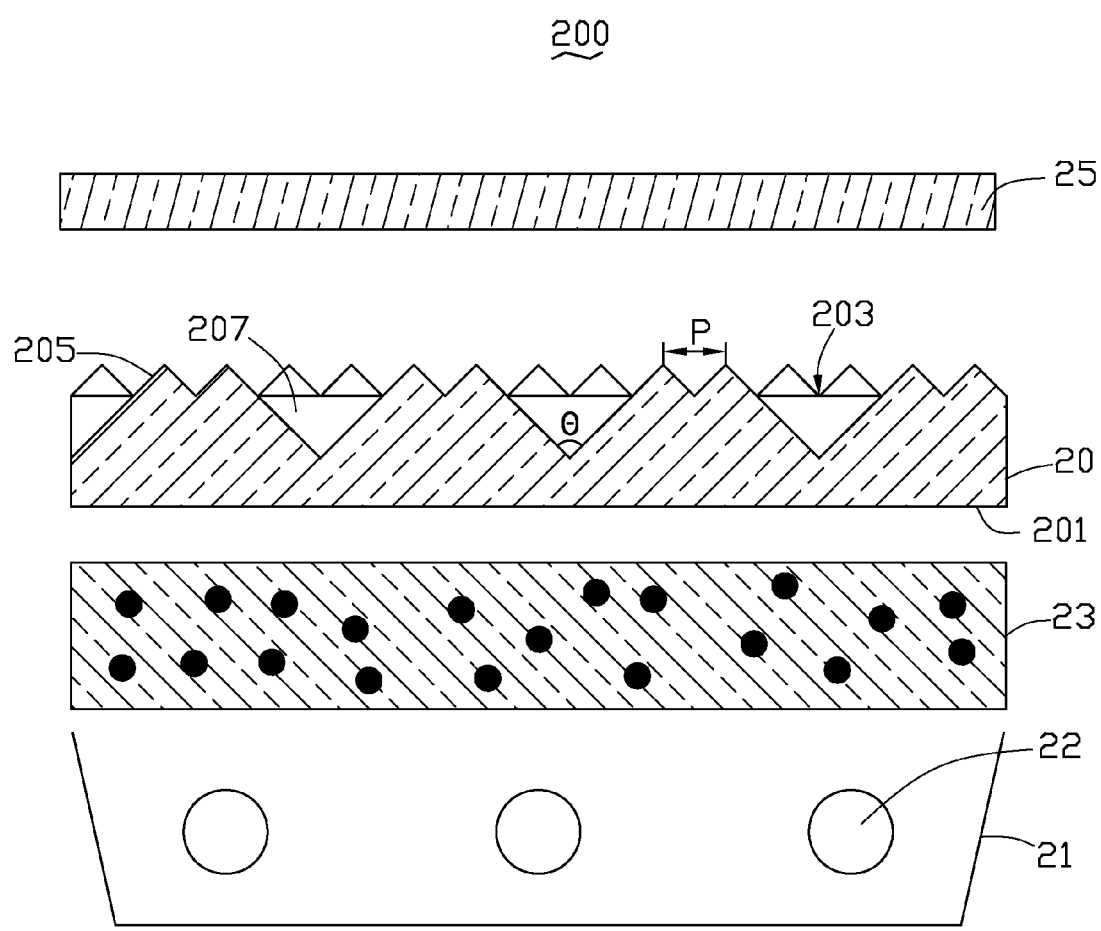
FIG. 1 is an exploded, side cross-sectional view of a liquid crystal display device in accordance with a first embodiment of the present invention.

Referring to FIG. 1, a liquid crystal display device 200 of the present invention is shown. The liquid crystal display device 200 includes a housing 21 and a plurality of lamps 22 positioned in the housing 21. The liquid crystal display device 200 further includes a light diffusion plate 23, a prism sheet 20, and a LCD panel 25 stacked on the housing 21 in that order.

Figure 2:
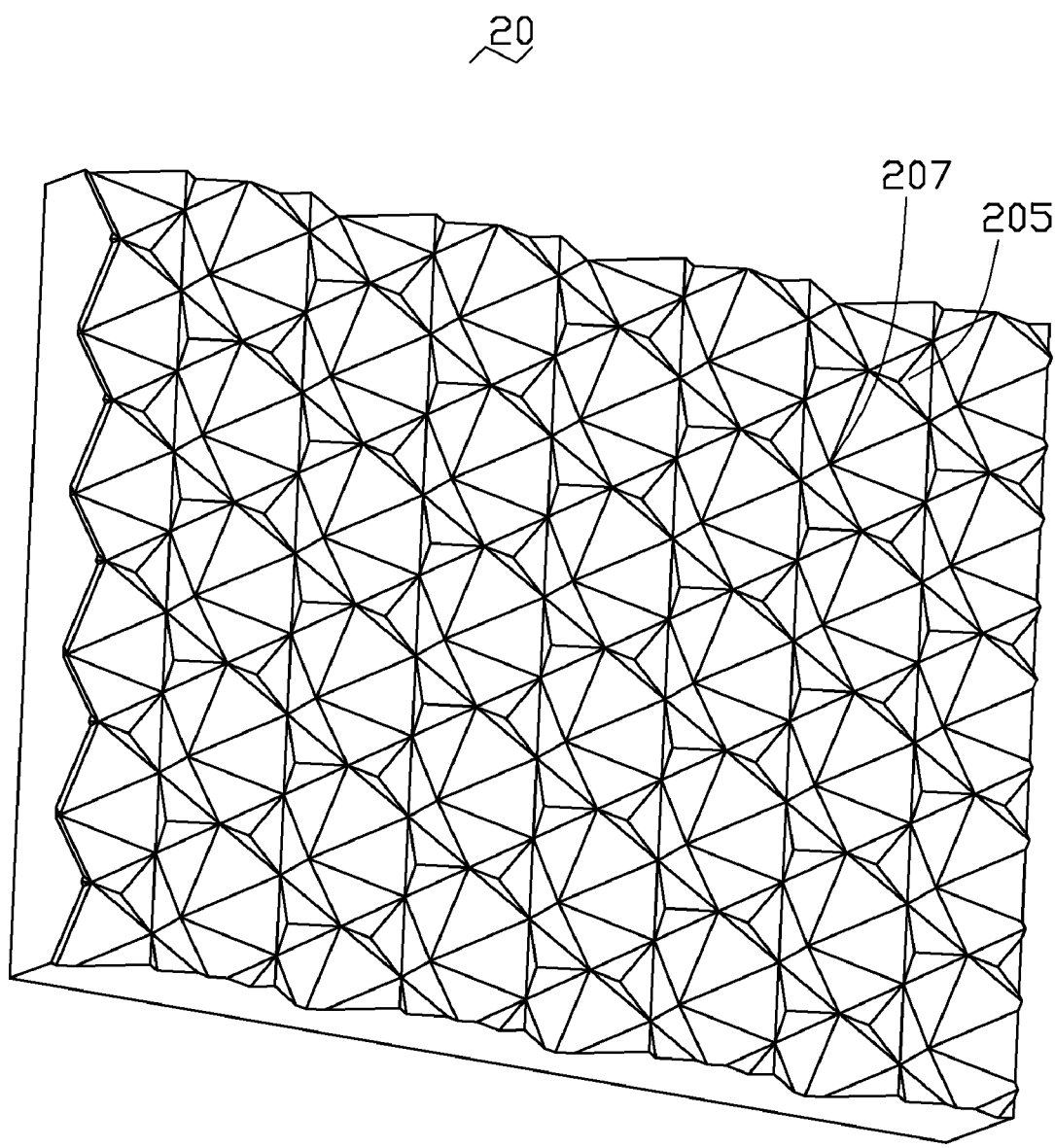
FIG. 2 is an isometric view of the prism sheet of FIG. 1.
Figure 3:
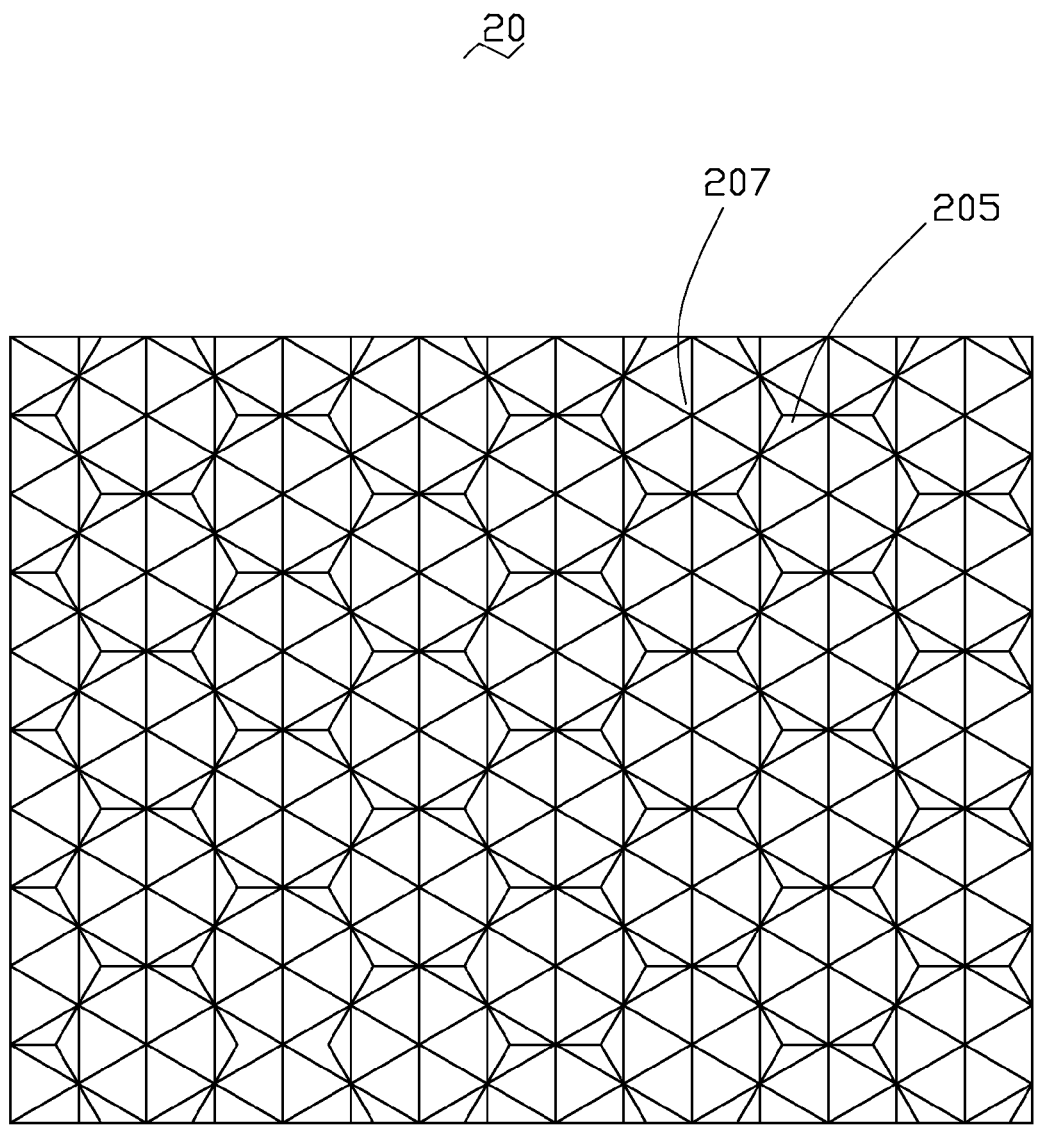
FIG. 3 is a top plan view of the prism sheet shown in FIG. 2.

Referring to FIGS. 2 and 3, the prism sheet 20 includes a light input surface 201, a light output surface 203, a plurality of triangular pyramidal micro-elements 205, and a plurality of hexagonal pyramidal micro-elements 207. The light output surface 203 and the light input surface 201 are on opposite sides of the prism sheet 20. The light input surface 201 faces the light diffusion plate 23 and the light output surface 203 faces the LCD panel 25. The triangular pyramidal micro-elements 205 and the hexagonal pyramidal micro-elements 207 are all formed on the light output surface 203. Each triangular pyramidal micro-element 205 is surrounded by three adjacent hexagonal pyramidal micro-elements 207 correspondingly. Bottom surfaces of each hexagonal pyramidal micro-element 207 and each triangular pyramidal micro-element 205 are coplanar with the light output surface 203. The triangular pyramidal micro-elements 205 and the hexagonal pyramidal micro-elements 207 can be depressions or protrusions. In the illustrated embodiment, each triangular pyramidal micro-element 205 is a protrusion protruding from the light output surface 203, each hexagonal pyramidal micro-element 207 is a depression depressed inward from the light output surface. In addition, a pitch P of adjacent centers of adjacent triangular pyramidal micro-elements 205 is configured to be in a range from about 0.0125 millimeters to about 0.05 millimeters. A dihedral angle θ defined by opposite side surfaces of each hexagonal pyramidal micro-element 207 is configured to be in a range from about 60 degrees to about 120 degrees.

The prism sheet 20 can be integrally formed by injection molding technology. A thickness of the prism sheet 20 can be in a range from about 3 millimeters to 5 millimeters. The prism sheet 20 can be made of a material selected from the group consisting of polycarbonate, polymethyl methacrylate, polystyrene, copolymer of methyl methacrylate and styrene, and any suitable combination of those.

In use, light emitted from the lamps 22 enters the light diffusion plate 23. The light is substantially diffused in the light diffusion plate 23. Subsequently, light exiting the light output surface 203 is condensed by the triangular pyramidal micro-elements 205 and the hexagonal pyramidal micro-elements 207 of the prism sheet 20. As a result, a brightness of the liquid crystal display device is increased. In addition, the shape of the triangular pyramidal micro-elements 205 is different from that of the hexagonal pyramidal micro-elements 207. Thus moiré patterns, caused by the pixels arrangement of the LCD panel 25 and the lining/structural patterns of the triangular pyramidal micro-elements 205 or the patterns of the hexagonal pyramidal micro-elements 207 can be kept minimal or eliminated.

Furthermore, there is no need to add/include an upper light diffusion film between the prism sheet 20 and the LCD panel 25. This increases an efficiency of light utilization. Moreover, when the prism sheet 20 is employed in the liquid crystal display, the prism sheet 20 can replace the conventional combination of a prism sheet and an upper light diffusion film. Thereby, an assembly process of the liquid crystal display is simplified. Moreover, the single prism sheet 20 instead of the combination of two optical sheets/films can reduce costs.

In addition, in contrast to the conventional prism sheet, the prism sheet 20 is integrally formed by injection molding technology. Injection molding allows to easier mass-produce the prism sheet 20 over the conventional method. Furthermore, because the prism lenses of the conventional prism sheet are formed by solidifying melted ultraviolet-cured transparent resin, the prism lenses of the conventional prism sheet are easily damaged and/or scratched due to poor rigidity and mechanical strength. The prism sheet 20 has a better rigidity and mechanical strength than the conventional prism sheet.

It should be pointed out that, the interior of the housing 21 is configured to be highly reflective.

Figure 4:
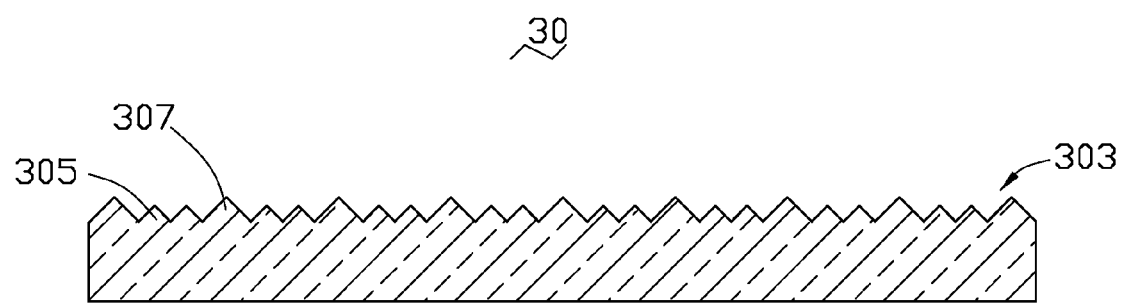
FIG. 4 is a side cross-sectional view of a prism sheet in accordance with a second embodiment of the present invention.
Figure 5:
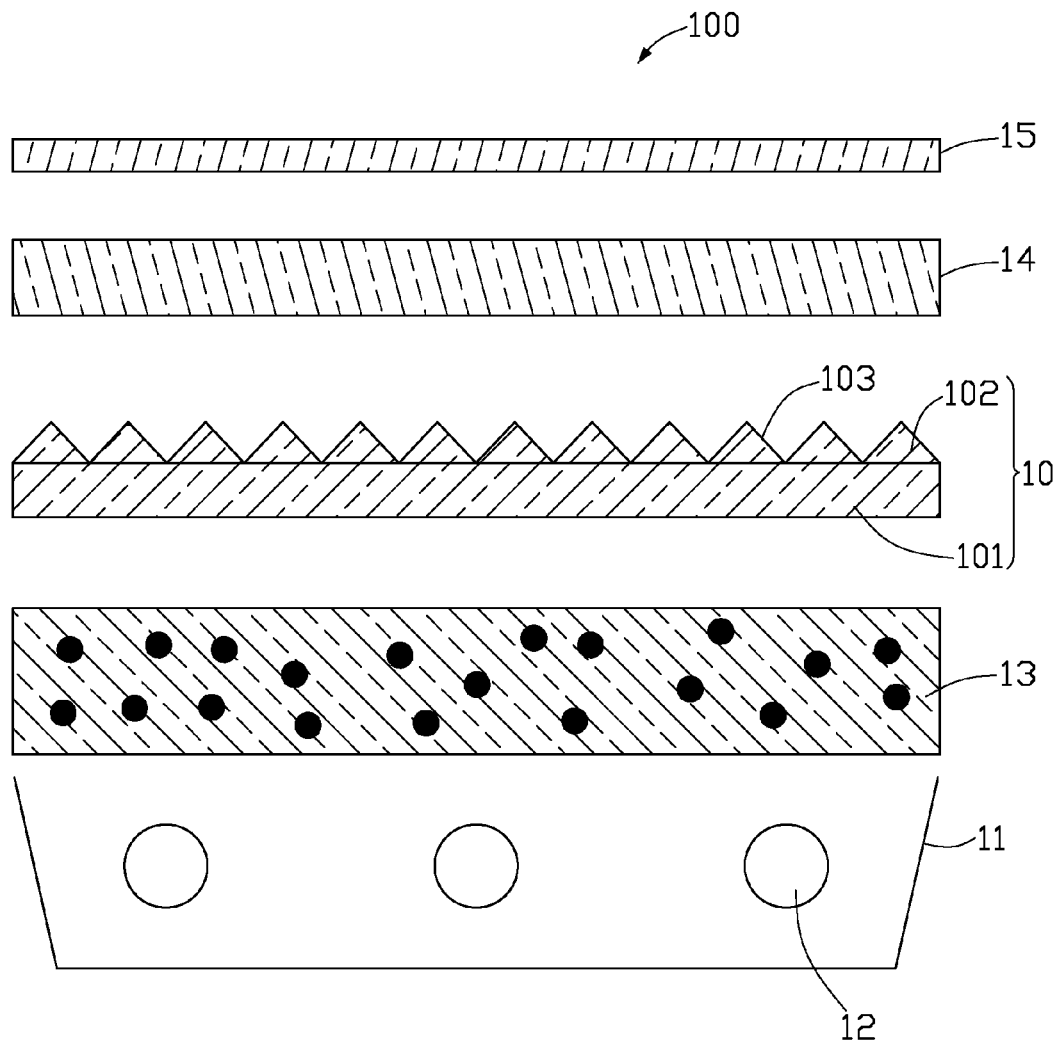
FIG. 5 is an exploded, side cross-sectional view of a conventional liquid crystal display.
Figure 6:
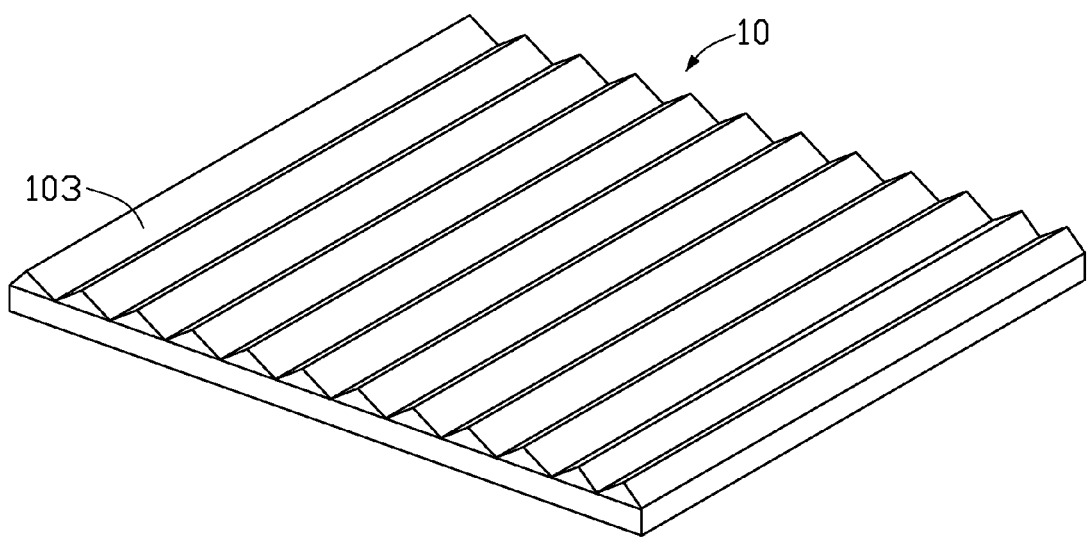
FIG. 6 is an isometric view of a prism sheet of the liquid crystal display device of FIG. 5.

Referring to FIG. 4, an optical plate 30 in accordance with a second preferred embodiment is shown. The optical plate 30 is similar in principle to the optical plate 20 of the first embodiment, a plurality of triangular pyramidal micro-elements 305 and hexagonal pyramidal micro-elements 307 are formed on the light output surface 303, however both the triangular pyramidal micro-elements 205 and the hexagonal pyramidal micro-elements 207 are protrusions.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. A prism sheet, comprising:
   a light input surface;
   a light output surface opposite to the light input surface; and
   a plurality of triangular pyramidal micro-elements and a plurality of hexagonal pyramidal micro-elements formed on the light output surface, wherein each triangular pyramidal micro-element is surrounded by three adjacent hexagonal pyramidal micro-elements, bottom surfaces of each hexagonal pyramidal micro-element and each triangular pyramidal micro-element are coplanar with the light output surface, and the triangular pyramidal micro-elements and the hexagonal pyramidal micro-elements are depressions in the light output surface.

2. The prism sheet as claimed in claim 1, wherein a pitch of adjacent centers of triangular pyramidal micro-elements is configured to be in a range from about 0.0125 millimeters to about 0.05 millimeters.

3. The prism sheet as claimed in claim 1, wherein a dihedral angle defined by opposite side surfaces of each hexagonal pyramidal micro-element is in a range from about 60 degrees to about 120 degrees.

4. The prism sheet as claimed in claim 1, wherein a material of the prism sheet is selected from the group consisting of polycarbonate, polymethyl methacrylate, polystyrene, copolymer of methylmethaciylate and styrene. and any suitable combination thereof.

5. The prism sheet as claimed in claim 1, wherein a thickness of the prism sheet is in a range from about 3 millimeters to about 5 millimeters.

6. A liquid crystal display device comprising:
   at least one light source;
   a light diffusion plate positioned above the at least one light source;
   a prism sheet positioned above the light diffusion plate, the prism sheet comprising:
      a light input surface;
      a light output surface opposite to the light input surface; and
      a plurality of triangular pyramidal micro-elements and hexagonal pyramidal micro-elements formed on the light output surface, wherein each triangular pyramidal micro-element is surrounded by three adjacent hexagonal pyramidal micro-elements, bottom surfaces of each hexagonal pyramidal micro-element and each triangular pyramidal micro-element are coplanar with the light output surface, and the triangular pyramidal micro-elements and the hexagonal pyramidal micro-elements are depressions in the light output surface; and a liquid crystal display panel positioned above the prism sheet.

7. The liquid crystal display device as claimed in claim 6, further comprising a housing, wherein the light source is being positioned in the housing.

8. The liquid crystal display device as claimed in claim 6, wherein a pitch of adjacent centers of adjacent triangular pyramidal micro-elements is in a range from about 0.0125 millimeters to about 0.05 millimeters.

9. The liquid crystal display device as claimed in claim 6, wherein a dihedral angle defined by opposite side surfaces of each hexagonal pyramidal micro-element is in a range from about 60 degrees to about 120 degrees.

10. The liquid crystal display device as claimed in claim 6, wherein a thickness of the prism sheet is in the range from about 3 millimeters to about 5 millimeters.

* * * * *